(12) United States Patent
Patel et al.

(10) Patent No.: US 7,013,366 B2
(45) Date of Patent: Mar. 14, 2006

(54) PARALLEL SEARCH TECHNIQUE FOR STORE OPERATIONS

(75) Inventors: Rajesh B Patel, Austin, TX (US); James David Dundas, Austin, TX (US); Mukesh R. Patel, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 423 days.

(21) Appl. No.: 10/107,947

(22) Filed: Mar. 26, 2002

(65) Prior Publication Data

US 2003/0187814 A1    Oct. 2, 2003

(51) Int. Cl.
*G06F 12/00*    (2006.01)

(52) U.S. Cl. .................. 711/117; 711/140; 711/154; 712/216

(58) Field of Classification Search ............. 711/117, 711/140, 154; 712/216
See application file for complete search history.

(56) References Cited

U.S. PATENT DOCUMENTS

| | | | | |
|---|---|---|---|---|
| 5,694,574 A | * | 12/1997 | Abramson et al. | 711/140 |
| 5,724,536 A | * | 3/1998 | Abramson et al. | 712/216 |
| 5,751,983 A | * | 5/1998 | Abramson et al. | 712/216 |
| 5,778,245 A | * | 7/1998 | Papworth et al. | 712/23 |
| 5,881,262 A | * | 3/1999 | Abramson et al. | 712/216 |

* cited by examiner

*Primary Examiner*—Stephen C. Elmore
(74) *Attorney, Agent, or Firm*—Erik M. Metzger

(57) ABSTRACT

A method and apparatus for satisfying load operations by accessing data from a store buffer is described herein. The present invention further relates to satisfying load operations faster than prior art techniques in most cases. Finally, the present invention provides an improved technique for satisfying load operations that does not significantly impact processor performance.

30 Claims, 8 Drawing Sheets

US 7,013,366 B2

PARALLEL SEARCH TECHNIQUE FOR STORE OPERATIONS

FIELD OF THE INVENTION

The invention described herein relates to the field of microprocessor architecture. More particularly, the invention relates to satisfying load operations without incurring significant degradation in processor performance.

BACKGROUND

Microprocessor performance may be increased within a computer system by enabling load operations to be satisfied from fast-access memory resources, such as cache, before resorting to computer system memory resources, such as Dynamic Random Access Memory (DRAM), which may require more time to access. Data or instructions stored within DRAM are typically organized along page boundaries requiring extra "open" and "close" memory cycles when accessed. Data and/or instructions may also be stored within cache memory, such as a Level 2 (L2) cache memory in order to facilitate faster access of frequently-used data.

Memory resources, such as DRAM and L2 cache, may be included as part of a computer system's memory hierarchy, in which data or instructions may be stored according to the frequency of their use. Data or instructions may then be accessed from or stored to these memory resources in various proportions in order to satisfy load and store operations efficiently.

In the case of a load operation, the decision of which memory resource to access within the system memory hierarchy depends upon where the most current version of the addressed data or instruction is located at a particular time. For example, a particular memory location addressed by a load operation may not have the "freshest" data at a particular time, since prior store operations may still be pending, which have not written their data to the memory location. Therefore, until the store operation updates the memory location addressed by the load operation, the load operation may access "stale" data causing incorrect results or errors in program operation.

Instead of waiting for fresh data to be stored within the computer system's memory hierarchy, load operations may be satisfied by accessing one or more store buffers in which store operations are temporarily stored before being executed by a processor and subsequently writing their data to a location within the computer system's memory hierarchy. By accessing a store operation from a store buffer, the load operation may be satisfied and program operation may continue with correct data.

However, load operations may depend on multiple store operations. Therefore, a load operation must be able to obtain data from the most recent (youngest) store operation that has been issued to a store buffer before the issuance of the load operation (i.e., The youngest store that is older than the load). Determining which store a load ultimately depends upon may require a large amount of hardware and several bus cycles to complete.

A prior art technique of determining which store a load ultimately depends upon employs a Carry Chain Algorithm (CCA) to perform a store prioritization, as illustrated in FIGS. 1a and 1b. The CCA in FIGS. 1a and 1b can be used to search an entire 64 entry store buffer and indicate which store buffer entry group should be read out to the read port, based on the location of the youngest store upon which a load depends. The CCA may be implemented with a carry look-ahead circuit similar to that used in a high-performance adder circuit. Furthermore, a CCA may be able to perform the store prioritization in order (log N) levels of logic, where N is the number of store buffer entries in a particular store buffer.

The CCA-64 of FIGS. 1a and 1b is composed of a level of 4-bit CLA (CLA-4) blocks 101 that compute propagate (P) and generate (G) signals, which are inputs to the next CLA-4 level 105. The P and G signals travel up the tree, until the top "special wrap" level is reached, at which point the P and G signals are used to compute carry (C) bits. The carries propagate down the tree, with each CLA-4 level computing additional carries. All of the carries are available when the bottom of the 64-bit CCA tree is reached.

The logic used in each CLA-4 block and the wrap block is described by the equations 115 of FIGS. 1a and 1b, where P corresponds to non-matching CAM vector entry positions, G indicates the load color position within a CAM vector, and C indicates the CAM vector position of a matching target address of the youngest store operation older than a load operation being processed.

The special wrap logic 110 is similar to that used in the CLA-4 blocks, with a modification to allow carries to wrap around the end of the CCA and provide the "carry-in" at position 63. This is to allow a search to proceed around the end of a circular store buffer, such as a circular fast store-forwarding buffer.

In the prior art, one carry look-ahead CCA was used to perform an ordered search on all store buffer entries. However, one short-coming of this approach is that the CCA's worst-case time to complete a store prioritization is approximately equal to its best-case time. This is because the carry bits are propagated through the adder in parallel with the sum bits. While this may be acceptable for some sizes of store buffers, it can be detrimental to overall system performance as the store buffer size is increased.

It is generally desirable to increase the size of store buffers within a super scalar microprocessor to the extent that it is economically viable to do so. Increasing the size of store buffers within a microprocessor reduces the number of cases in which a load must resort to system memory to retrieve data, and therefore decreases the cycle time overhead associated with accessing system memory.

Another concern arises when the desired data is ultimately identified and read out of a store buffer entry to be used by a load operation. Identifying and subsequently reading data from the store buffer entry can, in some cases, gate other pending operations along a microprocessor's critical path. The prior art is, therefore, further limited by the size of store buffers that may be searched due to the amount of time necessary to service a load on the microprocessor's critical path.

BRIEF DESCRIPTION OF THE DRAWINGS

The features and advantages will become apparent from the following detailed description in which.

DETAILED DESCRIPTION

A method and apparatus for satisfying load operations by accessing data from a store buffer is described herein. The present invention further relates to satisfying load operations faster than prior art techniques in most cases. Finally, the present invention provides an improved technique for satisfying load operations without significantly impacting processor performance.

A Computer System

Figure 2:
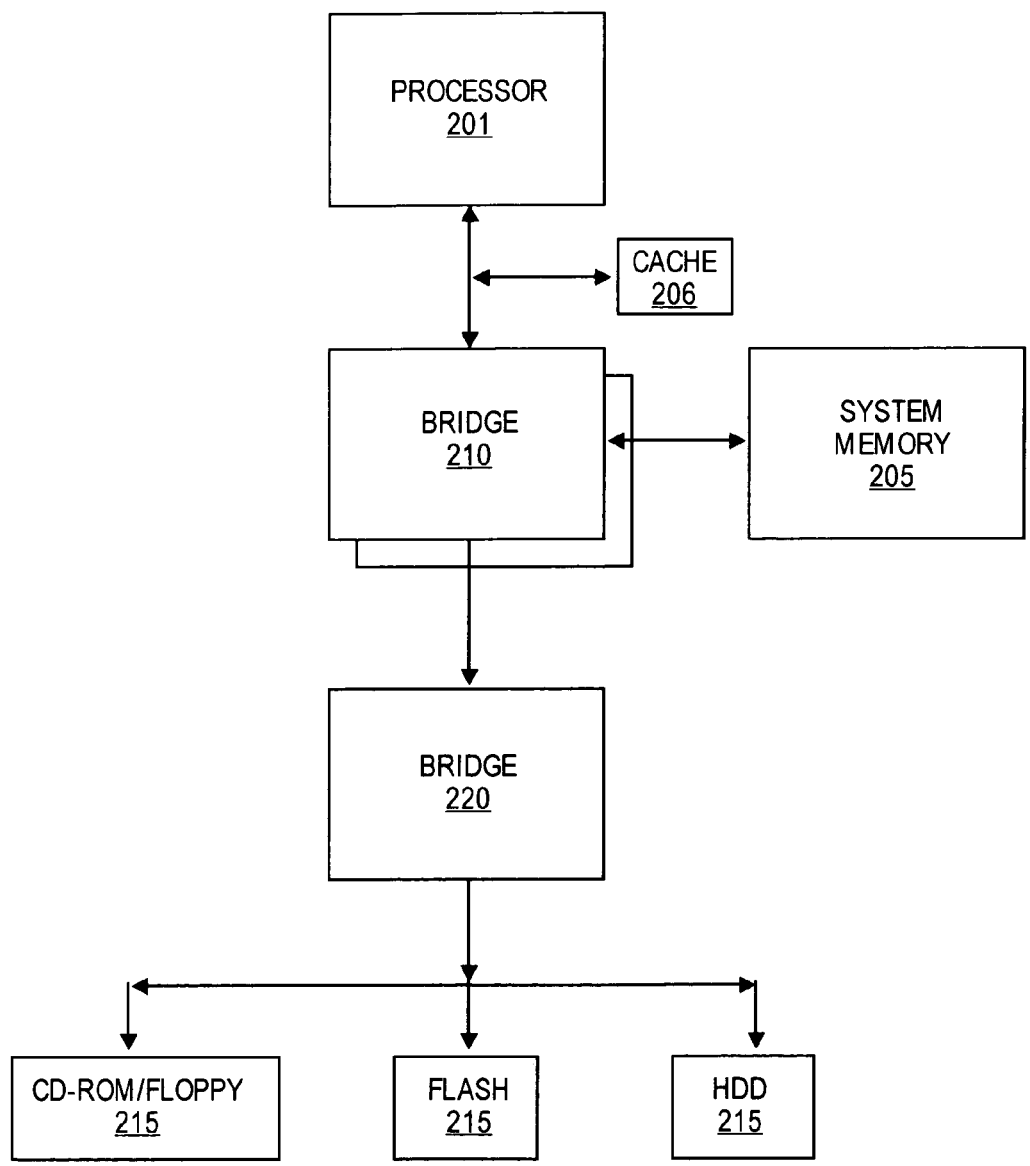
FIG. 2 illustrates a computer system according to one embodiment of the present invention.

FIG. 2 illustrates a computer system in which the present invention can be used. The computer system of FIG. 2 contains a processor 201, system memory 205, a bridge device 210, and a non-volatile memory device 215.

The computer system illustrated in FIG. 2 may also consist of cache memory 206, and system memory 207. In one embodiment, the cache memory is a Level 2 (L2) cache and the system memory is a Dynamic Random Access Memory (DRAM). The L2 cache memory and DRAM of FIG. 2 may consist of memory cells using Complimentary Metal-Oxide Semiconductor (CMOS) technology. However, other device technology as well as other memory devices may be used in other embodiments.

In the computer system illustrated in FIG. 2, instructions to be executed by the processor and data corresponding to the instructions may be stored within a non-volatile memory device and copied to locations within system memory. The non-volatile memory device may contain a machine readable medium to store a set of instructions, which when executed perform various operations and methods used in the present invention. In one embodiment, the non-volatile memory device is a Hard Disk Drive (HDD). In other embodiments, the non-volatile memory device is a as flash memory, a compact disk drive, floppy disk drive, or a combination of these.

Typically, data and instructions may be accessed or modified faster when stored within memory structures, such as L2 cache and DRAM, than when stored in a non-volatile memory device, such as an HDD. Therefore, software applications to be executed within a computer system, such as the one in FIG. 2, may be developed to access data and/or instructions within L2 cache and/or DRAM, before resorting to non-volatile memory.

Furthermore, applications executed within a computer system, such as that of FIG. 2, may organize data or instructions such that frequently used data or instructions are stored within the L2 cache, while less-frequently used data or instructions are stored within DRAM. The reason for organizing memory in this manner is to take advantage of the faster access capabilities of the L2 cache in relation to that of DRAM.

DRAM is typically organized in page or segment memory structures. Before data may be accessed within DRAM, the page in which the data is to be read or written must be first 'opened' by issuing a bus command to the DRAM. Likewise, before another page may be accessed within DRAM, a previously opened page must first be 'closed' by issuing a bus command to the DRAM. Opening and closing pages of DRAM causes degradation in overall computer system performance due to the additional cycles needed to open and close the pages. This problem may be exacerbated as data or instructions are accessed within the DRAM more frequently. Storing frequently used data or instructions within a cache structure, such as an L2 cache, may, therefore, help to improve overall computer system performance.

A Processor

Figure 3:
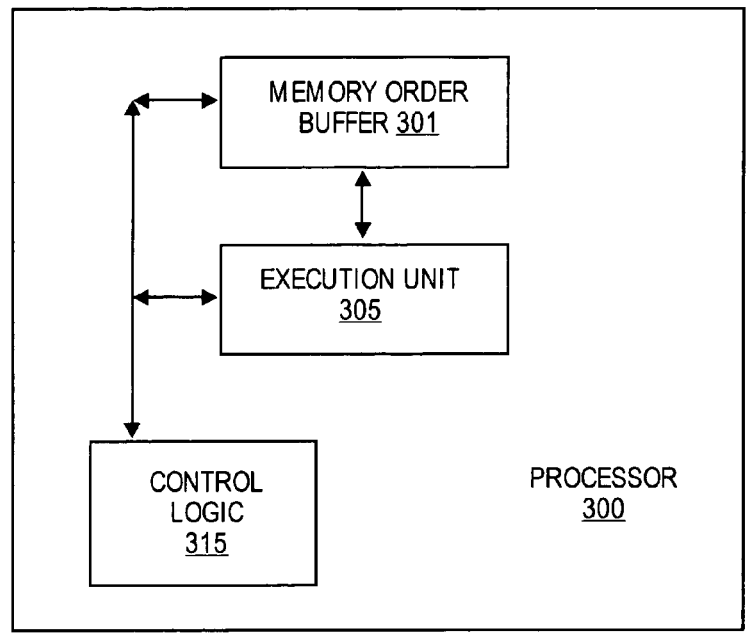
FIG. 3 illustrates a processor according to one embodiment of the present invention.

FIG. 3 illustrates a processor according to one embodiment of the present invention. The processor of FIG. 3 includes an execution unit 305, a memory ordering buffer (MOB) 301, and control logic 315.

In one embodiment of the present invention, the microprocessor of FIG. 3 is a pipelined, super scalar processor that may contain multiple stages of processing functionality. Accordingly, multiple instructions may be processed concurrently within the processor, each at a different pipeline stage. Furthermore, the execution unit may be pipelined in order to execute multiple instructions concurrently.

Some instructions executed within the processor may access data via load operations in order to complete execution. However, load operations may be dependent upon store operations taking place or ones that have taken place as a result of executing prior instructions. Memory accessed by load and store operations may include various memory structures, including Level 1 (L1) cache, Level 2 (L2), and DRAM.

L1 cache is cache memory that is typically within close proximity to the processor. Like L2 cache, L1 cache consists of high-speed memory cells and may be used to store frequently accessed instructions and/or data. In one embodiment, L2 or L1 cache may consist of 6-transistor (6-T) static random-access memory (SRAM) cells manufactured using standard complementary metal-oxide semiconductor (CMOS) memory devices. Alternatively, other embodiments may use other memory technologies and architectures without departing from the scope of the present invention.

In embodiments of the present invention, L1 cache, L2 cache, and DRAM or combinations thereof compose a system memory hierarchy. Relative sizes of the L1 cache, L2 cache, and DRAM may be chosen to optimize performance and system cost by storing instructions and data within these memory structures according to the frequency of their use.

A Memory Ordering Buffer

Figure 4:
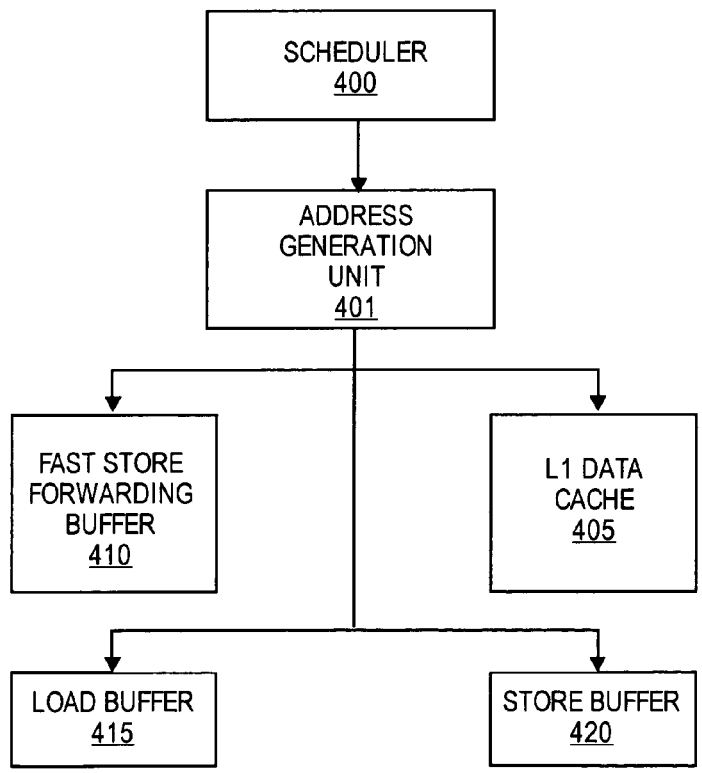
FIG. 4 illustrates a memory ordering buffer architecture according to one embodiment of the present invention.

FIG. 4 illustrates a memory ordering buffer (MOB) architecture according to one embodiment. The MOB of FIG. 4 includes a scheduler 400 to schedule and issue load and store operations to an L1 data cache 405 and/or a store buffer 410, respectively. In one embodiment, the store buffer is a fast store-forwarding buffer (FSFB). The FSFB is a memory device that may store operations intended to store data to system memory when executed. Store operations within the FSFB can be accessed by load operations quickly in order to retrieve data upon which the load depends, without resorting to the system memory hierarchy.

Store operations within a store buffer are subsequently executed the locations within the system memory hierarchy addressed by the stores are updated. Load operations may, however, be satisfied by retrieving data from store operations queued within the store buffer, rather than waiting for a store within the store buffer to update the memory hierarchy.

Since numerous store operations may contain data to be stored within the same location within the memory hierarchy, it may be necessary to search through entries of the store buffer to locate the most recent ("youngest") store operation upon which a load operation depends. In some instances, the search may require substantial time and hardware for large store buffers, such as those used in super scalar microprocessor architectures. Therefore, a technique in which to search a large store buffer for the youngest store upon which a load operation depends is desirable.

Searching a Store Buffer

A feature of the present invention is an ability to determine which store operation within a store buffer a load is dependent upon relatively quickly within a majority of cases. Furthermore, the present invention facilitates the servicing of loads while helping to prevent performance degradation by performing at least part of the search incidentally to a microprocessor's critical path.

In one embodiment of the present invention an ordered search is performed in which the youngest store older than the load (the "load color") and the oldest (least recently stored) store older than the load (store buffer "tail") are identified and decoded. The load color and store buffer tail can be indicated by a two bit signal, which is assigned, for example, by an instruction scheduler state machine when load operations are scheduled for execution. In other embodiments, the load color and store buffer tail can be indicated employing other techniques without departing from the scope of the present invention.

Either before or after a load color is determined, store operations within the memory hierarchy having a target address portion matching that of the load to be satisfied are identified. Matching store operations may be identified in various ways, including using a CAM, or Content Addressable Memory, to compare a target address portion of the load operation to that of a store operation. In one embodiment, each CAM corresponding to a store buffer entry includes comparison logic to perform the target address portion comparison. The result of this comparison may then be stored within the CAM for subsequent use.

Target address portion comparisons can be performed using various techniques, including those in the prior art. In one embodiment, store target address portions are compared with the load target address portions in a parallel fashion. In other embodiments, the comparison is done serially. Furthermore, a portion of the store operation target address may be either the entire target address or only a part of the target address in order to reduce the logic necessary to perform the comparison.

Figure 5:
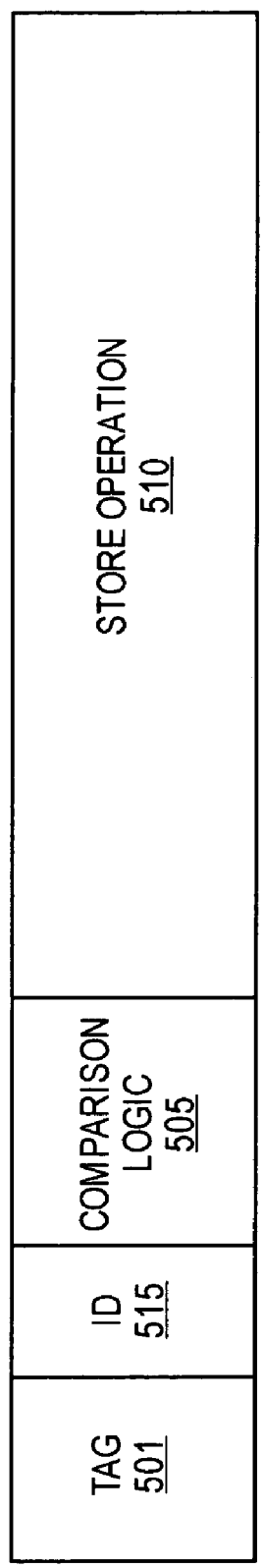
FIG. 5 illustrates a store buffer entry according to one embodiment of the present invention.

FIG. 5 illustrates a store buffer entry in accordance with one embodiment of the present invention. It includes a tag field 501 to hold a portion of a target address portion of the corresponding store operation 510 and comparison logic 505 capable of providing the result of a comparison between the target address portion stored in the tag and a target address portion of a load operation.

In some embodiments, a CAM may be used to implement the tag field, target address portion, comparison logic, or any combination thereof. Furthermore, a CAM may be used to store the result of the target address portion comparison for each store buffer entry.

In one embodiment of the present invention, the results of the target address comparisons comprise a CAM result vector stored, for example, in memory, a register, or among the CAMs themselves. An ordered search of the CAM result vector can then be performed to identify the location of the youngest store upon which a load depends.

The ordered search yields a carry vector whose entries indicate corresponding locations within the CAM result vector of a matching target address portion according to the equation $C_i=G_i+P_iC_{i+1}$, where i is an index from 0 to N−1 entries within the store buffer, and increasing index values indicate younger store operations. Other equations may be used to implement the target address search in other embodiments. Likewise, other embodiments may perform the above search out of program order, and may propagate the search through the store buffer entries along other paths than those set forth in the present embodiment.

The above equation may be implemented using various carry generation circuits or algorithms. In one embodiment of the present invention, carry generation logic of a carry-ripple adder carry generation circuit may be used to implement the above equation. In another embodiment, carry generation logic of a carry look-ahead adder circuit is used to implement the search. In other embodiments a combination of a carry-ripple adder carry generation and carry look-ahead circuits and/or other circuits may be used. Furthermore, the above carry generation equation may be implemented with hardware circuits, software, or a combination thereof.

Figure 6:
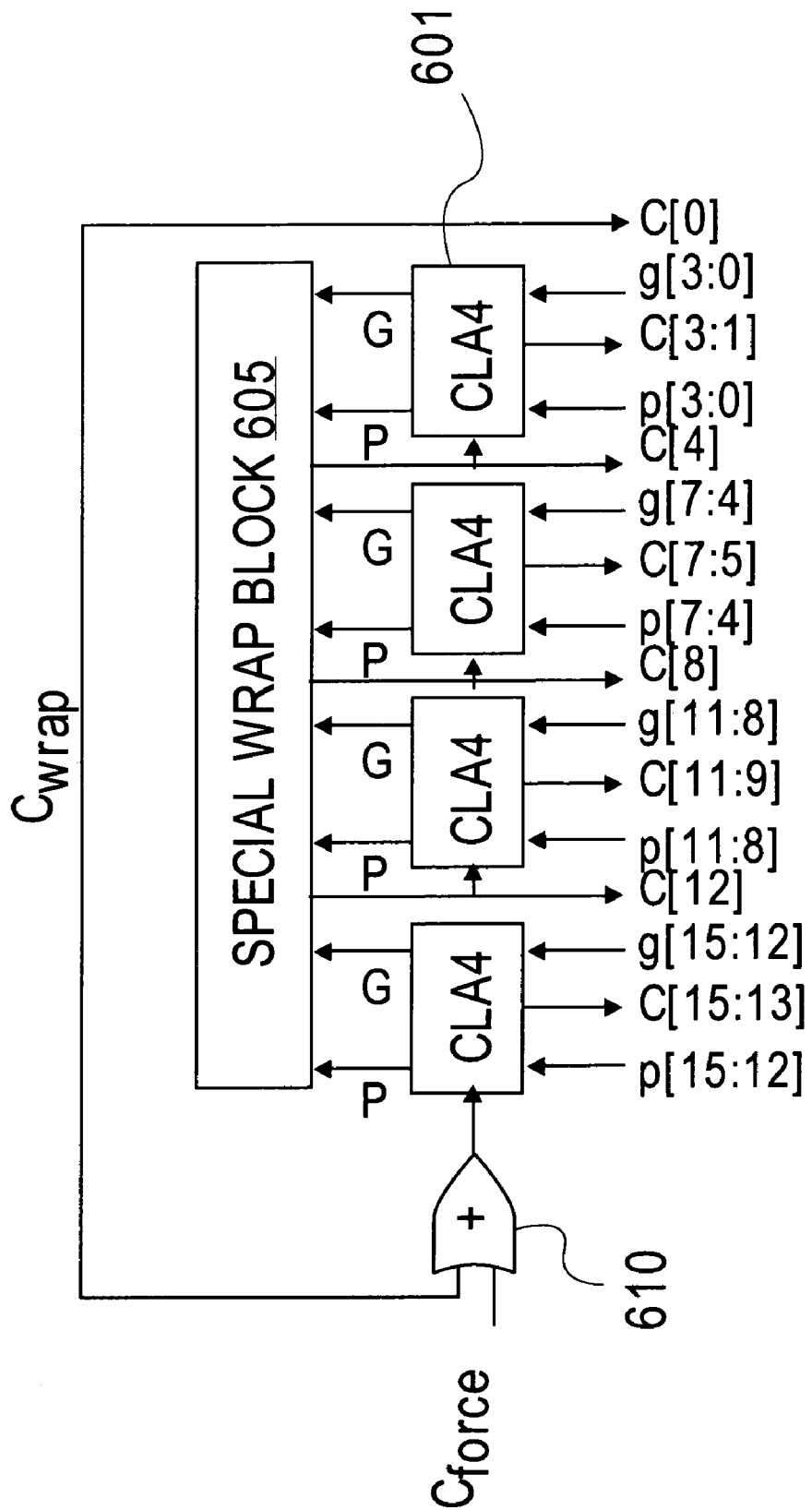
FIG. 6 Illustrates a 16-bit CCA according to one embodiment of the present invention

FIG. 6 illustrates a 16-bit CCA (CCA-16) according to one embodiment of the present invention. The embodiment illustrated in FIG. 7 is independent of the CCA size, and a 64 entry store buffer subdivided into 16 entry groups is used only by way of example.

Figure 1A:
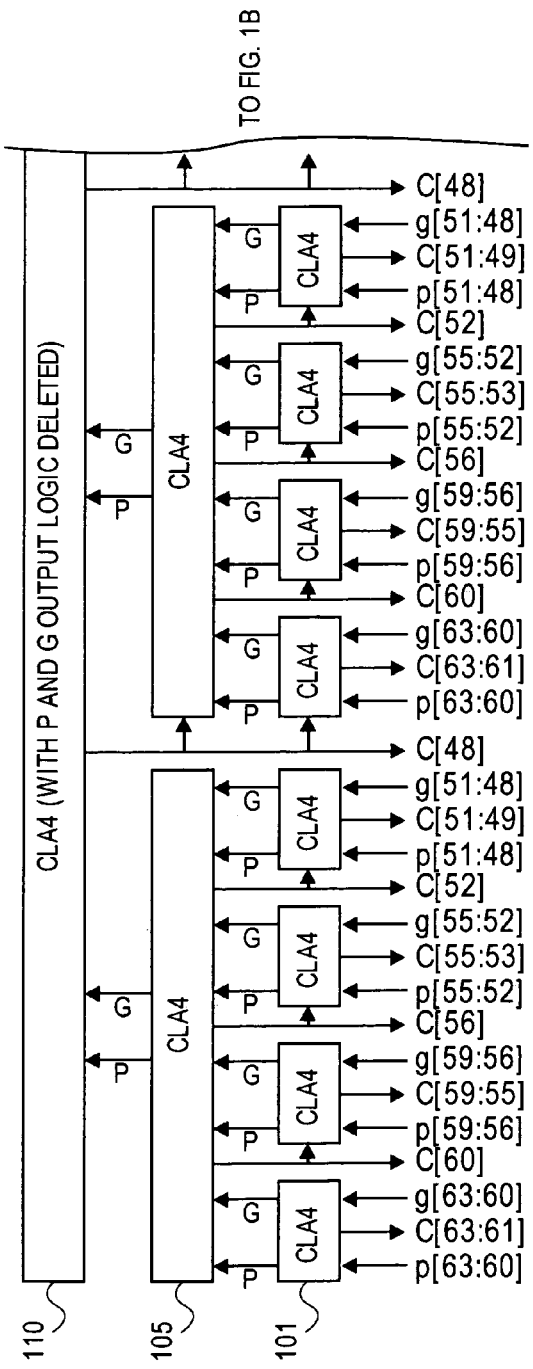
FIGS. 1a and 1b illustrate a prior art architecture for implementing a Carry Chain Algorithm.
Figure 1B:
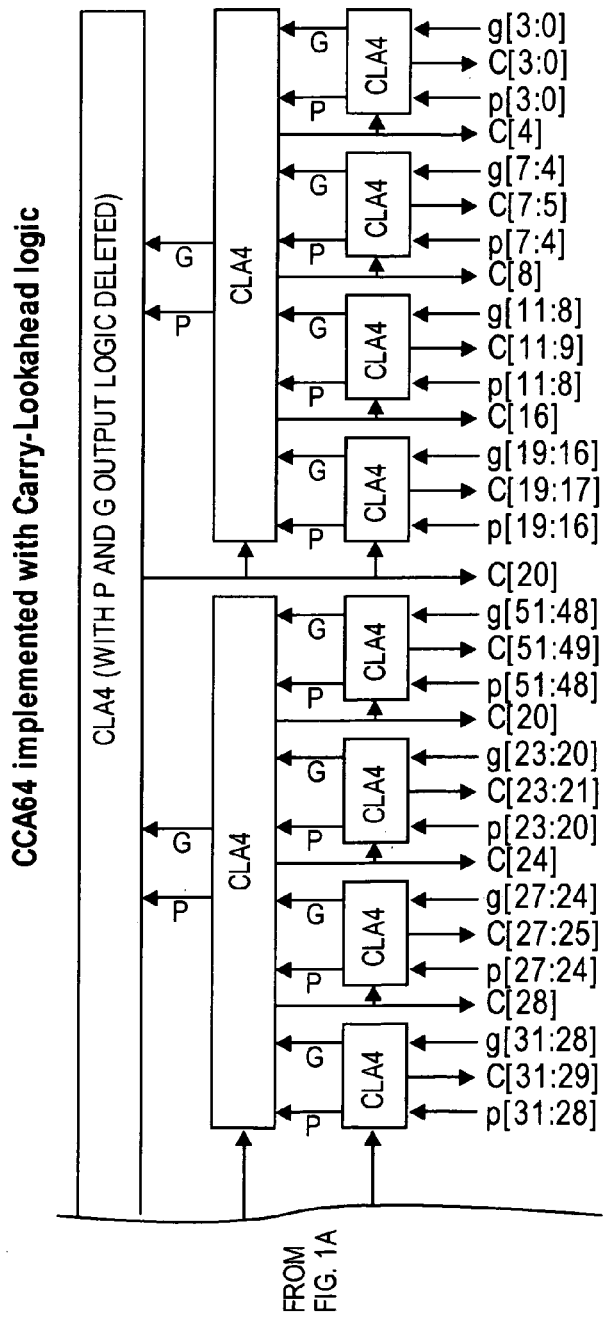

In the CCA-16 of FIG. 6, there is only one level of CLA-4 blocks 601 due to the logarithmic nature of the carry chain algorithm used in this particular embodiment. Furthermore, the special wrap block 605 used in the CCA-16 can be substantially similar to that used in the CCA-64. An OR gate 610 is used to allow a carry to be forced into the C[15] position in order to force the search to start at the beginning of the CCA-16. The input to the leftmost CLA-4 of FIG. 6 corresponds to the C[4] term in the CLA-4 equation of FIGS. 1a and 1b.

Figure 7:
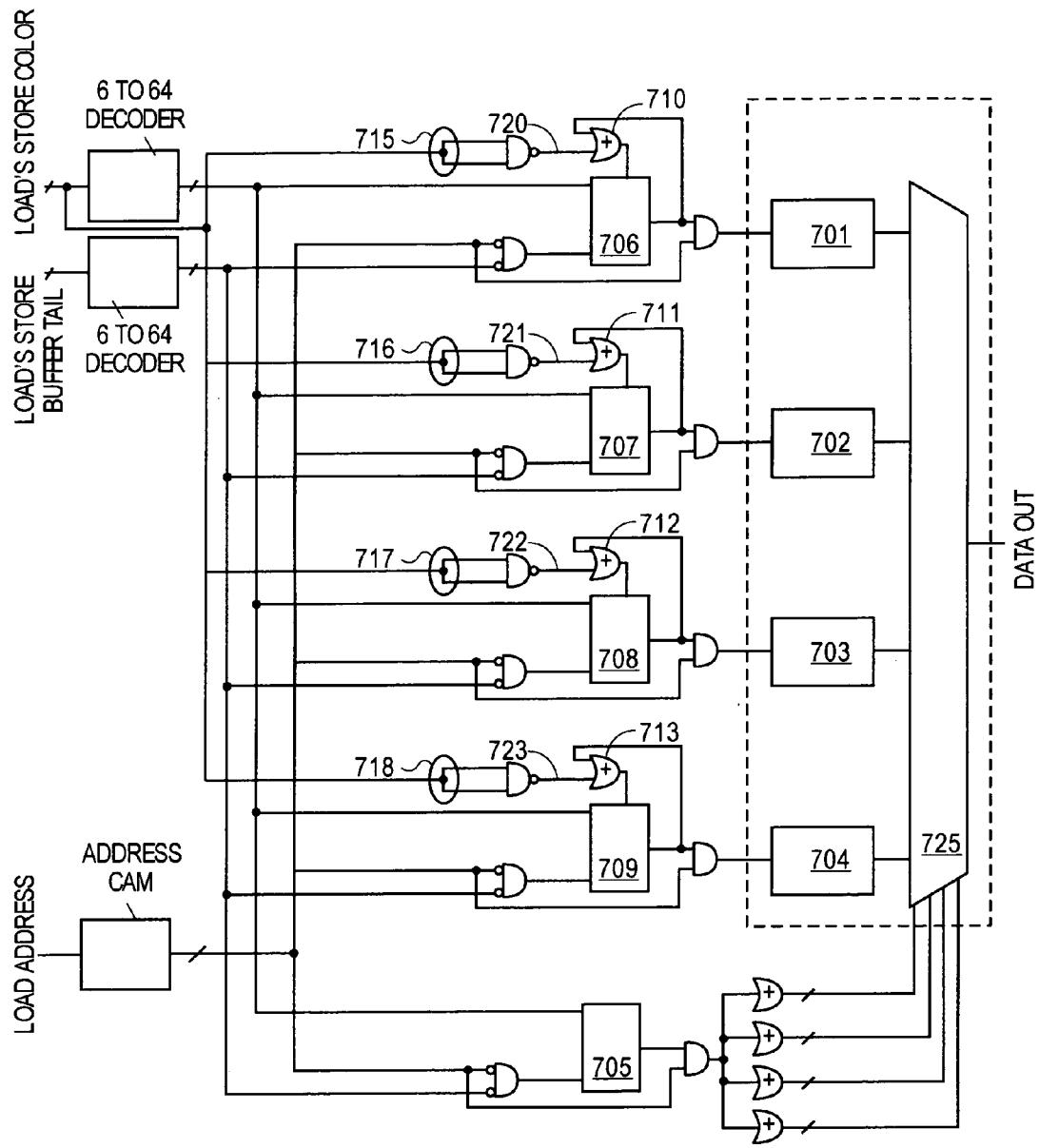
FIG. 7 illustrates a store buffer employing an apparatus to satisfy load operations according to one embodiment of the present invention.

FIG. 7 illustrates a store buffer that employs a search technique according to one embodiment of the present invention. The present invention takes advantage of the order (log N) levels of logic of a CCA by splitting an N-entry store buffer search into M smaller store buffer entry groups, thus reducing levels of logic to order (log N/M). For example, a typical 64-entry (N=64) store buffer may require 10 levels of logic to implement a CCA-64 within a critical path of a microprocessor. However, the present invention allows the 64-entry store buffer to be split into four (M=4) store buffer entry groups 701–704 of 16 entries each. The CCA-16 search units 706–709 require only six levels of logic, thereby imposing less delay in the critical path of the microprocessor in which it is implemented.

As mentioned, the CCA-16 can be substantially similar to a CCA-64, and may use at least some of the same CLA-4 blocks. In fact, one of the only differences between a CCA-64 and CCA-16 in the present invention is that the CCA-16 does not require the second level of CLA-4 blocks.

However, in order to facilitate independent and parallel searching of each 16-entry store buffer entry group, the wrap-around carry from position 0 to position 15 of the CCA-16 may need to be modified. In particular, an OR gate 710–713 and/or other logic may be used to force a carry wrap-around to the beginning of a CCA-16 when the end of a CCA-16 is reached. This is done, for example, in the case where the load color of the load being processed does not point to one of the 16 entries in a store buffer entry group being searched. In the case in which the load color does exist within the store buffer entry group being searched, the search may also wrap around to the beginning of the store buffer entry if the load tail is not encountered before searching the last entry of the CCA-16 store buffer entry group.

In one embodiment, the forced input 720–723 to the wrap logic (OR gate in the example illustrated in FIG. 8) is generated by decoding the top two bits 715–718 of the load color of the load being processed. This allows each CCA-16 to search for a matching store within a store buffer entry group to which it corresponds.

In addition to the store buffer entry group CCA's, a search is also made away from the critical path of a microprocessor employing the present invention in parallel with the store buffer entry group searches. In one embodiment, the non-critical path search is performed using a CCA-64 705 to identify the youngest store upon which a load depends. The CCA-64 is then used to select at least one of the store buffer entry groups containing the youngest store buffer entry upon which the load depends. In one embodiment, the selection is accomplished by encoding the output of the CCA-64 into selection signals of a MUX 725.

By dividing the search of a store buffer among a global search off of the critical path in parallel with smaller store buffer entry group searches within the critical path, performed in parallel with each other, the total search time can be reduced. This is due, at least in part, to the time cumulative time required to search a store buffer and subsequently read out resulting data contained in the youngest store upon which a load depends. The present invention accomplishes this by performing parallel tasks, such as searching and reading out the result from the appropriate store buffer entry, on and off of the critical path of the microprocessor.

A Method for Servicing Load Operations According to One Embodiment

Figure 8:
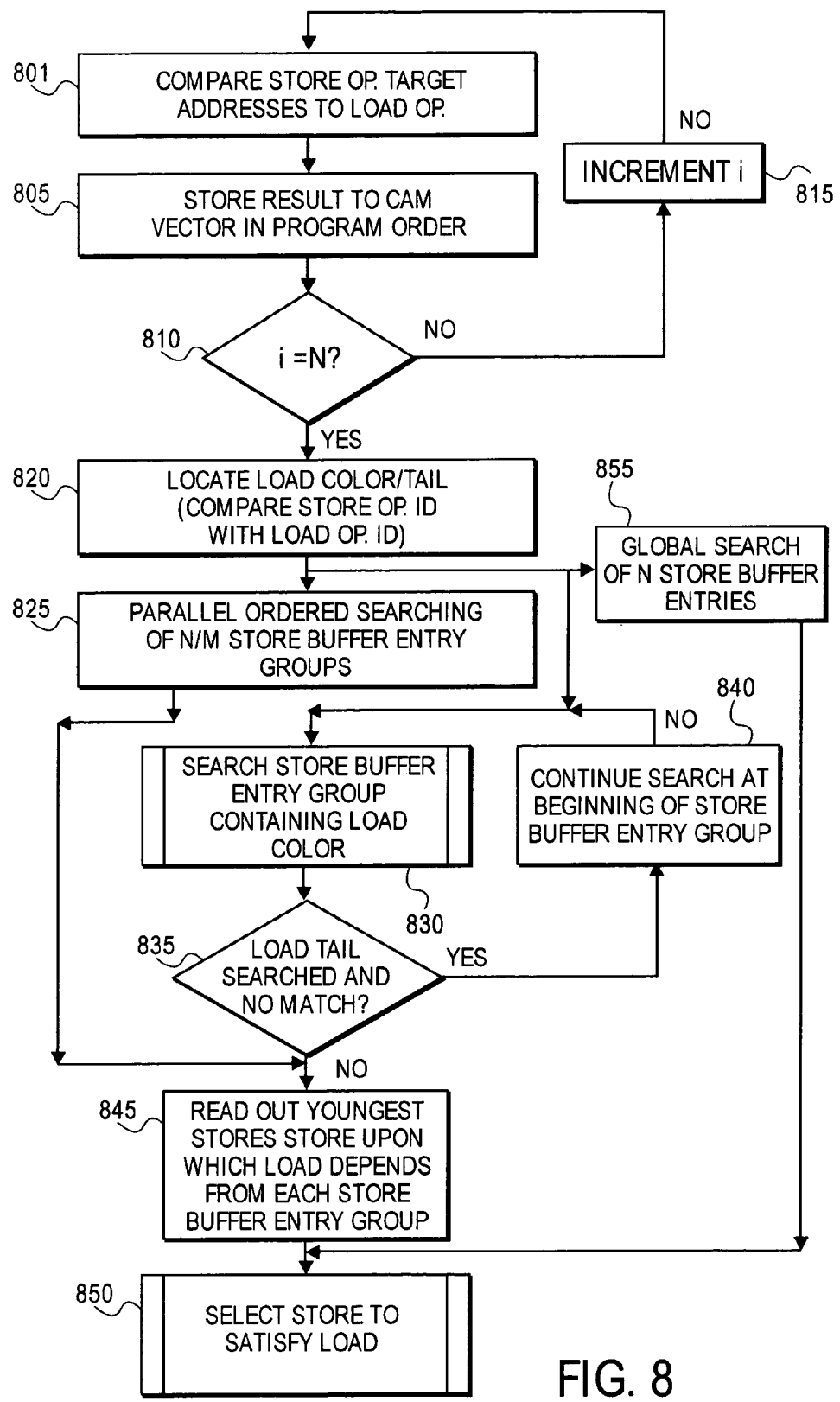
FIG. 8 is a flow diagram illustrating a method according to one embodiment of the present invention.

FIG. 8 illustrates a method for carrying out the present invention according to one embodiment. A CAM match is performed on each entry of the store buffer 801 to create a CAM vector 805 indicating the relative locations of store operations with a matching target address portion to that of the load operation being processed. This process continues until all store buffer entries have been searched, as indicated with counter i. If i does not equal N (number of store buffer entries) 810, then i is incremented 815 and CAM matching continues.

Once all store buffer entries have been CAM matched and a CAM vector created, the load color and tail are identified 820. In the embodiment of FIG. 9 each CAM vector entry is stored in program order according the identification field associated with the corresponding store operation. By comparing the identification field of each store operation to that of the load operation being processed, the load color and tail may be identified. The load color and tail are identified by setting $G_i$ to 1 at the corresponding location in the $G_i$ vector.

An ordered search on the CAM vector entries is then performed 825. In one embodiment of the present invention, the ordered search is performed by searching N/M store buffer entry groups in parallel (where N is the number of store buffer entries and M is the number store buffer entries within a group). In such an embodiment, the N store buffer entries are searched in parallel with the search of N/M store buffer entry groups in order to select which of the N/M store buffer entries contains the most recent store operation upon which the load depends.

While ordered searches are taking place in each store buffer entry group, the store buffer entry group containing the load color is being searched 830 until either a match is found or a load tail is encountered. If no match or load tail is encountered 835 when the end of the store buffer entry group is reached, the search is continued 840 at the beginning of the store buffer entry group until the load or matching entry is detected.

In parallel with the ordered searches of the store buffer entry group is a global search 855 of the entire store buffer incidental to a critical path of a processor with which a store buffer is associated. The result of the global search then selects 850 the result of the search buffer entry groups corresponding to the youngest store operation upon which a load depends.

While this invention has been described with reference to illustrative embodiments, this description is not intended to be construed in a limiting sense. Various modifications of the illustrative embodiments, as well as other embodiments , which are apparent to persons skilled in the art to which the invention pertains are deemed to lie within the spirit and scope of the invention.

What is claimed is:

1. A method comprising:
   searching a plurality of store buffer entry groups, each comprising a plurality of store buffer entries, in parallel for a most recent store operation upon which a load operation depends;
   selecting at least one of said plurality of store buffer entry groups comprising said most recent store operation upon which said load depends.

2. The method of claim 1 further comprising satisfying said load operation with data associated with said most recent store operation upon which said load operation depends.

3. The method of claim 2 wherein said selecting comprises searching said plurality of store buffer entries in parallel with said searching said plurality of store buffer entry groups.

4. The method of claim 3 wherein said searching said plurality of store buffer entries and said searching said plurality of store buffer entry groups comprises using a circuit to perform a carry chain algorithm.

5. The method of claim 4 wherein searching one of said plurality of store buffer entry groups begins at a load color within said one of said plurality store buffer entry groups.

6. The method of claim 5 wherein said search wraps around to a beginning store buffer entry within said store buffer entry group if a store buffer tail is sequentially before said load store within said one of said plurality of store buffer entry groups.

7. The method of claim 3 wherein said selecting is performed outside of a critical path of a microprocessor.

8. An apparatus comprising:
   a plurality of search units to search a plurality of store buffer entry groups, each comprising a plurality of store buffer entries, in parallel;
   a selection unit to select from results of said plurality of search units a search result corresponding to a most recent store operation upon which a load operation depends.

9. The apparatus of claim 8 further comprising a main search unit to search said plurality of store buffer entry groups in parallel with said plurality of search units outside of a processor critical path.

10. The apparatus of claim 9 wherein said main search unit is enabled to signal to said selection unit to select said search result corresponding to said most recent store operation upon which said load operation depends.

11. The apparatus of claim 10 further comprising a load color decoder coupled to said plurality of search units.

12. The apparatus of claim 11 wherein said load color decoder decodes a signal to select one of said plurality of search units comprising a load color.

13. The apparatus of claim 12 further comprising a load tail decoder coupled to said plurality of search units.

14. The apparatus of claim 13 wherein said load tail decoder decodes a signal to select one of said plurality of search units comprising a load tail.

15. The apparatus of claim 8 further comprising wrap around logic to enable at least one of said plurality of search units to continue searching within at least one of said plurality of store buffer entry groups after a last store buffer entry within said at least one of said plurality of store buffer entry groups is searched.

16. The apparatus of claim 15 wherein said plurality of search units and said main search unit each comprise a unit to perform a carry-chain algorithm, said unit to perform said carry-chain algorithm comprising carry look-ahead carry generation logic.

17. A machine-readable medium having stored thereon a set of instructions, which if executed by a machine, cause said machine to perform a method comprising:
  performing a first search of a plurality of store buffer entry groups, each comprising a plurality of store buffer entries, in parallel;
  performing a second search of said plurality of store buffer entry groups in parallel with said first search;
  selecting one of said plurality of store buffer entry groups comprising a store buffer entry corresponding to a youngest store operation upon which a load depends;
  identifying requested data to said load operation with data corresponding to said youngest store operation.

18. The machine-readable medium of claim 17 wherein said first search comprises a plurality of searches equal to said plurality of store buffer entry groups.

19. The machine-readable medium of claim 18 wherein each of said plurality of store buffer entry groups comprises a number of store buffer entries equal to a total number of store buffer entries divided by said plurality of store buffer entry groups.

20. The machine-readable medium of claim 18 wherein at least one of said plurality of searches begins at a load color entry.

21. The machine-readable medium of claim 20 wherein said second search determines which of said plurality of store buffer entry groups is selected.

22. The machine-readable medium of claim 17 wherein said at least one of said plurality of searches wraps around to a first store buffer entry of a store buffer entry group after searching a last store buffer entry of said store buffer entry group.

23. The machine-readable medium of claim 22 wherein said first and second searches comprise using a circuit to perform a carry chain algorithm.

24. The machine-readable medium of claim 17 wherein said second search is performed outside of a microprocessor critical path.

25. A system comprising:
  a system memory;
  a processor, said processor comprising a search unit to identify requested data to a load operation without accessing said system memory, said search unit comprising a plurality of search units to search a plurality of store buffer entry groups, each comprising a plurality of store buffer entries, in parallel.

26. The system of claim 25 further comprising a global search unit, said global search unit to search said plurality of store buffer entry groups in parallel with said plurality of search units outside of a critical path of said microprocessor.

27. The system of claim 26 wherein said global search unit is enabled to select at least one of said plurality of store buffer entry groups comprising a youngest store operation upon which said load operation depends.

28. The system of claim 27 further comprising a load color decode unit to decode a load color store buffer entry within said plurality of store buffer entry groups.

29. The system of claim 28 further comprising logic to wrap around a search of a store buffer entry group to a first entry of said store buffer entry group after a last store buffer entry within said store buffer entry group is searched.

30. The system of claim 29 further comprising a multiplexer (MUX) coupled to said global search unit.

* * * * *